July 24, 1956 J. SUNKO ET AL 2,756,299

RADIO COVER SWITCH

Filed Aug. 10, 1953

INVENTORS.
William C. Biederman
BY John Sunko,
Foorman L. Mueller
Atty.

United States Patent Office 2,756,299

Patented July 24, 1956

2,756,299

RADIO COVER SWITCH

John Sunko, Elgin, and William C. Biederman, Des Plaines, Ill., assignors to Motorola, Inc., Chicago, Ill., a corporation of Illinois Application August 10, 1953, Serial No. 373,342

7 Claims. (Cl. 200—61.62)

The present invention relates generally to safety switches of the type which operate to de-energize an electrical circuit whenever the casing in which the circuit is mounted is opened, and the invention is directed more particularly to a switch for use in a portable radio or the like to de-energize the radio circuit when the cover of the cabinet is opened.

Present-day portable radios are often constructed to include a molded plastic cabinet in two sections, one functioning as the body for the radio, and the other as the cover. Such radios usually include a metal chassis, and are constructed to operate on either alternating current or direct current. When operating on alternating current, there is a possibility for the metal chassis to be established at a potential other than ground and, for that reason, precautions must be taken to de-energize the receiver whenever the cover is opened if shock hazard is to be prevented.

This de-energization of the receiver may be accomplished by a suitable switching means incorporated in the receiver and which functions to disconnect the alternating current power leads from the receiver whenever the cover of the cabinet is opened. However, the construction of such a switching means presents several problems. It has been found that the provision of an electrical contact on the cover of the cabinet which engages another electrical contact in the body of the cabinet to complete the energizing circuit when the cover is closed is not practical, since for adequate electrical connection, the necessary tension between these two contacts would render the opening of the cover extremely difficult if not impossible without breaking the cabinet. For this reason, switching arrangements have been provided in which a switch actuator is mounted on the cover of the cabinet. The actuator engages a switching device in the body of the cabinet and mechanically operates the device whenever the cover is closed. This latter arrangement also has presented problems since when a self-contained switching device is provided in the body of the cabinet, it is possible for a person accidentally to operate the switching device when the cover is opened, thereby energizing the chassis and creating the shock hazard referred to previously.

It is, accordingly, an object of the present invention to provide an improved cover switch for a portable radio receiver or the like which functions to de-energize the receiver whenever the cover is opened and yet which does not produce any excessive tension that would impede the opening of the cover of the radio cabinet.

A further object of the invention is to provide such an improved cover switch that is foolproof, and which positively provides for the de-energization of the radio receiver whenever the cover of its cabinet is opened.

Yet another object of the invention is to provide such an improved cover switch for a portable radio receiver that, for all practical purposes, cannot be operated when the cover is open; and yet which operates simply and efficiently, and despite manufacturing tolerances, to complete the energization circuit of the receiver whenever the cover is closed.

A feature of the invention is the provision of an enclosed switching device in the body portion of the cabinet of a portable radio receiver or the like, and to provide a switch actuator on the cover of the cabinet. The switching device is actuated mechanically by the switch actuator through a small opening in the enclosure to energize the receiver whenever the cover is closed and de-energize the receiver when the cover is opened.

Another feature of the invention is the provision of such an improved cover switch in which the switch actuator has a thin metallic strip section; and in which the switching device is surrounded by a cover member that prevents accidental operation of the switching device when the cover is opened, and which includes a thin slot to receive the strip section of the switch actuator when the cover is closed.

Yet another feature of the invention is the provision of such an improved cover switch in which the resilient switch actuator is resiliently mounted on the cover, and in which the slot in the switching device is surrounded by a concave surface which guides the strip section of the switch actuator into the slot despite small tolerances in the construction of the unit.

A still further feature of the invention is the provision of such an improved cover switch in which the switching device includes a slidable contact arm terminating in a bent-over portion having a series of transverse serrations parallel to the aforesaid slot. These serrations receive the end of the strip section of the switch actuator as it enters the slot to enable the latter to shift the contact arm and close the switching device whenever the cover is closed.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 2, 3, 4:
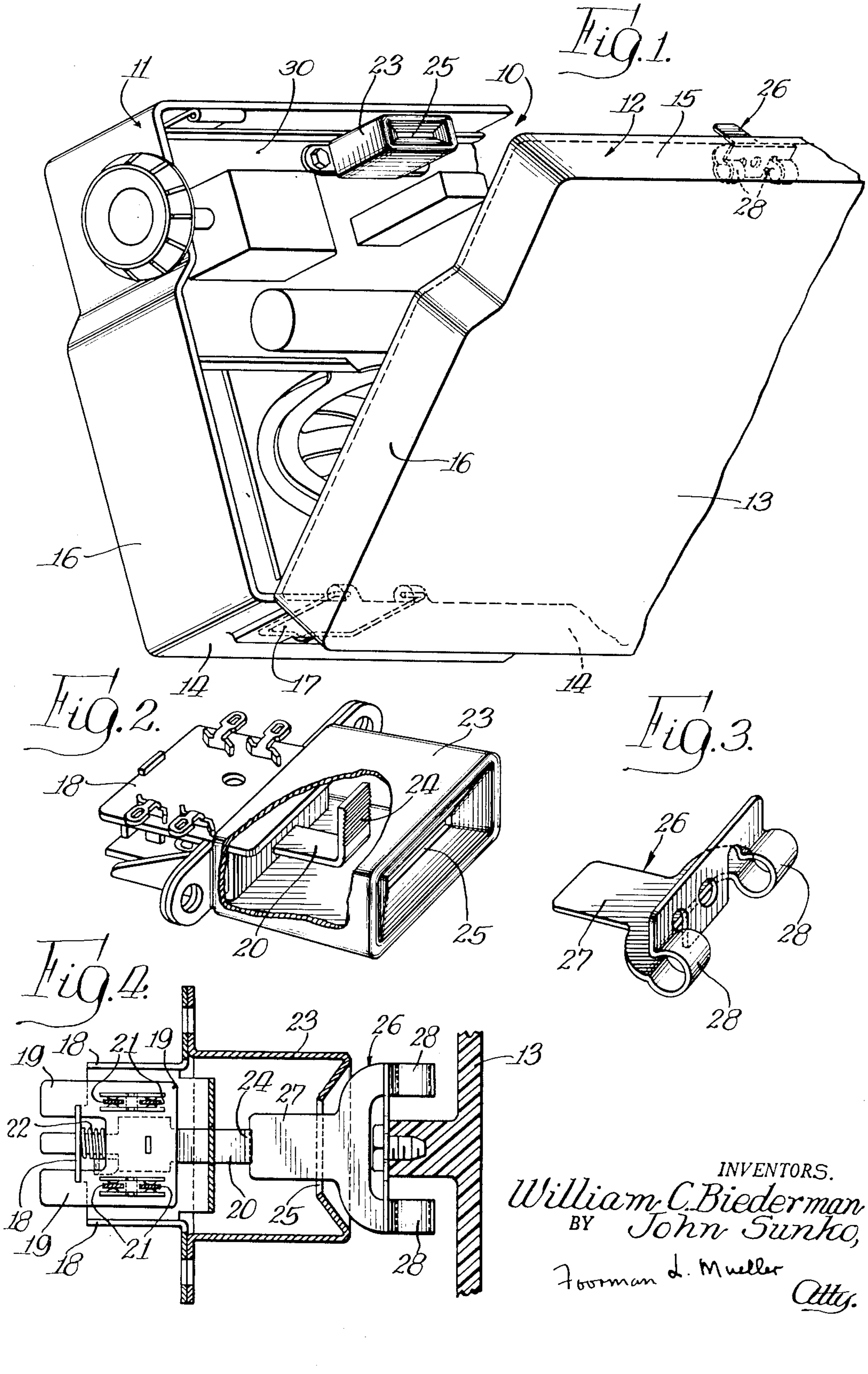
Figure 1 shows a portion of a portable radio receiver incorporating the improved cover switch of the present invention.
Figures 2 and 3 are perspective views of two of the components of the cover switch.
Figure 4 is a view partly in section of one of the components of the cover switch.

The cover switch of the present invention is intended to be used in a portable radio receiver, or the like, of the type having a molded cabinet with a pair of hinged casing sections, one of the casing sections constituting the body of the cabinet and the other the cover.

The cover switch to be described herein comprises a switch housing which is adapted to be mounted on one of the casing sections, and a contact arm slidably mounted within the housing and having one end protruding through the housing. A series of fixed contacts are mounted within the housing and resilient means is also mounted in the housing and is used to bias the contact arm in a direction to shift its protruding end outwardly from the housing and to shift the arm itself to a disengaged position with respect to the fixed contacts. A cover member is provided which surrounds the protruding end of the contact arm and which has an opening at one end facing the extremity of the protruding end of the contact arm. A switch actuating device is mounted on the other of the casing sections in a position to enable this device to enter the opening in the cover member and engage the extremity of the protruding end of the contact arm. In this manner, when the casing sections are closed, the switch actuating device moves the slidable contact arm inwardly into engagement with the fixed contacts and against the pressure of the resilient means. The fixed contacts are included in the energizing circuit from the alternating current power line, so that the receiver is de-energized when the cover is open but may be energized when it is closed.

Referring now to the drawing, a portable radio 10 is illustrated therein which has a pair of casing sections 11, 12. Each of the casing sections has an end wall 13, a bottom wall 14, a top wall 15, and a pair of side walls such as 16. A pair of hinges, such as hinge 17, is provided for securing together the bottom walls of the casing sections. The casing sections are preferably of well-known molded plastic construction with the walls thereof integral one with the other. The cover switch of the present invention includes a switch housing or bracket 18 which is mounted in casing section 11 under a chassis 30, and perpendicular to the top of the chassis. The switch also includes a contact arm 19 slidably mounted within housing 18, the contact arm having an end portion 20 protruding upwardly through the chassis. Two pairs of fixed contacts 21 are mounted within housing 18 and are adapted to be opened and closed by contact arm 19 as it moves from a disengaged to an engaged position. The fixed contacts are included in the energizing circuit from the alternating current line so that when contact arm 19 is moved to the left of Figure 4, the receiver may be energized, but when it is moved to the right, it is de-energized.

A compression spring 22 is mounted between housing 18 and the inner end of contact arm 19 and biases the contact arm to a position in which the pairs of fixed contacts 21 are open, and in which the end portion 20 protrudes through the housing a maximum amount.

A cover member 23 is mounted on the upper side of chassis 19 and surrounds the end portion 20 of the contact arm. The portion 20 of contact arm 19 has a bent-over extremity 24 having a plurality of serrations extending thereacross. The end of cover member 23 has a thin slot or slit 25 formed therein facing the bent-over extremity 24 of the contact arm, the slot extending parallel to the serrations in the extremity. In addition, the end of the cover member is formed to have a concave guiding surface surrounding slot 25. Slot 25 has a width of the order of $\frac{1}{16}''$ so that only extremely thin members can extend therein and actuate contact arm 19.

It is evident from the preceding description that whenever contact arm 19 is moved inwardly, that the receiver may be energized, but when the arm is released, resilient spring 22 urges it outwardly de-energizing the receiver. The provision of cover means 23 and slot 25 assures that when the cover of the receiver is open, the chances for the receiver to become energized are extremely small. The cover switch of the present invention also includes a switch actuator 26 which incorporates a thin resilient metallic strip 27 and which is mounted resiliently by a looped base portion 28 on casing section 16 adjacent the top wall of that section. The switch actuator 26 is mounted in such a position that its strip portion 27 extends perpendicularly to wall 12 of the cover and enters the slit 25 whenever the cover is closed. The strip engages one of the serrations on hte bent-over portion 24 of the contact arm 19 to shift the contact arm to its engaged position to the left of Figure 4 and close the various contacts. The resilient nature of the switch actuator strip 27, and its cooperation with the guiding surface at the end of cover 23, assures that the metallic strip will enter the slot and perform its switch actuating function despite misalignments between the cover and the body portion of the radio cabinet.

The improved cover switch of the present invention has been embodied in a commercial model of a portable radio receiver and has been found to operate efficiently and with a high degree of satisfaction. The action of switch actuator 26 in conjunction with the bent-over portion 24 of contact arm 20 positively assures that the receiver may be energized whenever the cover is closed, but de-energized when the cover is opened. Because of the mechanical cooperation between these elements, there is no undue tension or resistance by the switch to the opening or closing of the cover. The configuration of cover 23 assures that the switch will not be accidentally closed when the cover is opened and also assures that the metallic strip 26 will enter slit 25 whenever the cover is closed.

While a particular embodiment of the invention has been shown and described, modifications may be made and it is intended in the appended claims to cover all such modifications as fall within the true spirit and scope of the invention.

We claim:

1. A cover switch for a portable radio receiver and the like which has a pair of hinged casing sections enclosing a receiver chassis, said switch including in combination, a switch housing adapted to be mounted on the receiver chassis contained in one of the casing sections, a contact arm slidably mounted within said switch housing and having one end protruding through said housing and outwardly from the chassis, a plurality of fixed contacts mounted within said housing, resilient means within said housing for biasing said contact arm in a direction to move said protruding end thereof outwardly from said housing and to move said arm to a disengaged position with respect to said fixed contacts, a cover member adapted to be mounted on the chassis in a position surrounding said protruding end of said contact arm, said cover member having an opening at one end thereof facing the extremity of said protruding end of said contact arm, and a switch actuating means adapted to be mounted on the other of the casing sections in a position to enable said switch actuating means to enter said opening and engage the extremity of said protruding end of said contact arm when the casing sections are in a closed condition to move said protruding end inwardly and said contact arm into engagement with said fixed contacts against the pressure of said resilient means.

2. A cover switch for a portable radio receiver and the like which has a pair of hinged casing sections, said switch including in combination, a switch frame adapted to be mounted on one of the casing sections, a contact arm slidably mounted on said frame and having an end portion extending outwardly from said frame, at least one pair of fixed contacts mounted on said frame and adapted to be opened and closed by said contact arm, resilient means for biasing said contact arm to a position wherein said fixed contacts are open and wherein said end portion of said contact arm extends outwardly a maximum amount, a cover member surrounding said end portion of said contact arm and having a slotted opening facing the extremity of said end portion, and a switch actuating strip adapted to be mounted on the other of the casing sections in a position to enable said actuating strip to enter said opening and engage the extremity of said end portion of said contact arm when the casing sections are in a closed condition to move said end of said contact arm inwardly against the pressure of said resilient means and said contact arm to a position wherein said fixed contacts are closed.

3. A cover switch for a portable radio receiver and the like which has a pair of hinged casing sections, said switch including in combination, a slidably mounted contact arm having an end portion of large surface area, at least one pair of fixed contacts adapted to be opened and closed by sliding movement of said contact arm, resilient means for biasing said contact arm to a position wherein said fixed contacts are open, a cover surrounding said contact arm and having a slotted opening therein aligned with said end portion, and a switch actuated strip of small cross sectional area to pass through said slotted opening adapted to be mounted on the other of the casing sections in a position to enter said slotted opening and engage said end portion of said contact arm when the casing sections are in a closed condition thereby sliding said contact arm against the pressure of said resilient means to a position wherein said fixed contacts are closed.

4. A cover switch for a portable radio receiver and the like which has a pair of hinged casing sections, said switch including in combination, means adapted to be mounted on one of the casing sections including a slidable switch operating arm for opening and closing said switch, said operating arm having a bent-over extremity with a series of serrations extending thereacross, a cover member surrounding said operating arm and having a slot formed therein facing said bent-over extremity, said cover member having an external concave guiding surface surrounding said slot, and a thin resilient metallic strip resiliently mounted on the other of the casing sections in a position to enter said slot and engage a serration on said bent-over extremity when said casing sections are in a closed condition to move said arm to a position wherein said switch is closed.

5. A cover switch for a portable radio receiver and the like which has a pair of hinged casing sections, said switch including in combination, a switch housing adapted to be mounted on one of the casing sections, a contact arm slidably mounted within said switch housing and having an end portion protruding through said housing, said protruding end portion having a turned-up extremity with a series of spaced serrations extending thereacross, a plurality of fixed contacts mounted within said housing, resilient means within said housing for biasing said contact arm in a direction to move said protruding end portion thereof outwardly from said housing and to move said arm to a disengaged position with respect to said fixed contacts, a cover member surrounding said protruding end portion of said contact arm and having a narrow slot at one end thereof facing said turned-up extremity and substantially parallel with the aforesaid serrations thereon, said end of said cover member having an external concave guiding surface around said slot, and a switch actuating means having a thin resilient strip-like section and further having a resilient base portion adapted to be mounted on the other of the casing sections in a position to cause said strip-like section to enter said slot and engage said turned-up extremity of said protruding end of said contact arm when the casing sections are in a closed condition to move said protruding end inwardly and said contact arm into engagement with said fixed contacts against the pressure of said resilient means.

6. In a portable radio receiver and the like, including first and second molded casing sections each having an end wall, and each further having top, bottom and side walls integral with said end wall, hinge means securing the bottom walls of said casing sections to one another, the switch including in combination, a switch housing adapted to be mounted on one of the casing sections adjacent the top wall thereof, a contact arm slidably mounted within said switch housing and having an end portion protruding through said housing, at least one pair of fixed contacts mounted in said housing and adapted to be opened and closed by said contact arm, resilient means for biasing said contact arm to a position wherein said fixed contacts are open and wherein said end portion of said contact arm protrudes through said housing a maximum amount, a cover member surrounding said end portion of said contact arm and having an opening facing the extremity of said end portion, and a switch actuating means adapted to be mounted on the other of the casing sections adjacent the top wall thereof in a position to enable said actuating means to enter said opening in said cover member and engage the extremity of said end portion of said contact arm when the casing sections are in a closed condition to move said contact arm inwardly against the pressure of said resilient means to a position wherein said fixed contacts are closed.

7. In a portable radio receiver and the like, having first and second molded casing sections each including an end wall, and top, bottom and side walls integral with said end wall, and hinge means securing the bottom walls of said casing sections to one another, the switch including in combination, a switch bracket adapted to be mounted on one of the casing sections adjacent the top wall thereof, a contact arm slidably mounted on said bracket and having an end portion extending outwardly from said bracket, said end portion having a bent-over extremity with a series of serrations extending thereacross, at least one pair of fixed contacts mounted on said bracket and adapted to be opened and closed by said contact arm, resilient means for biasing said contact arm to a position wherein said fixed contacts are open and wherein said end portion of said contact arm extends outwardly a maximum amount, a cover member surrounding said end portion of said contact arm and having a slit in one end facing said bent-over extremity of said end portion and extending parallel to the serrations therein, and a thin resilient metallic strip resiliently mounted on the other of the casing sections adjacent the top wall thereof in a position to cause said strip to enter said slit in said cover member and engage one of the serrations in the bent-over extremity of said end portion of said contact arm when the casing sections are in a closed condition to move said contact arm inwardly against the pressure of said resilient means to a position wherein said fixed contacts are closed.

References Cited in the file of this patent

UNITED STATES PATENTS

| | | |
|---|---|---|
| 1,680,732 | De Tar | Aug. 14, 1928 |
| 1,862,928 | Gebhard | June 14, 1932 |
| 1,973,378 | Graesser | Sept. 11, 1934 |
| 2,290,521 | Young et al. | July 21, 1942 |
| 2,312,243 | Evans et al. | Feb. 23, 1943 |
| 2,439,708 | Abraham | Apr. 13, 1948 |

FOREIGN PATENTS

| | | |
|---|---|---|
| 634,753 | Great Britain | Mar. 29, 1950 |